2,807,137

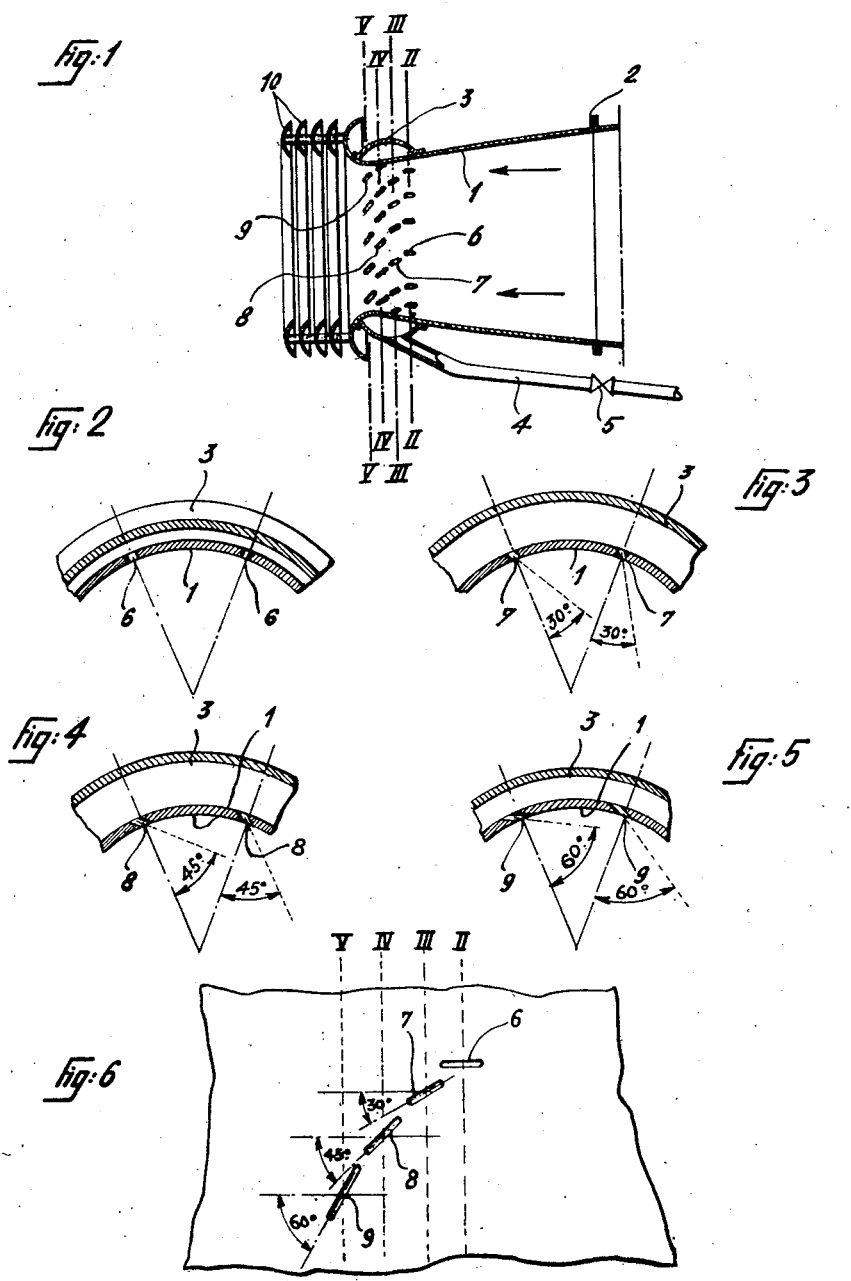

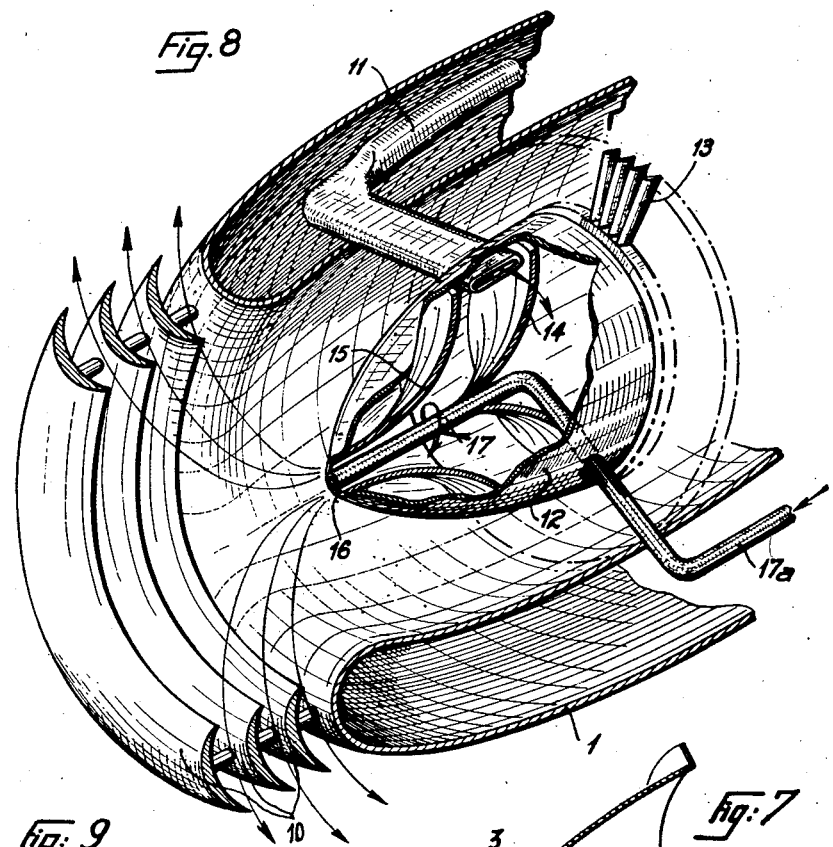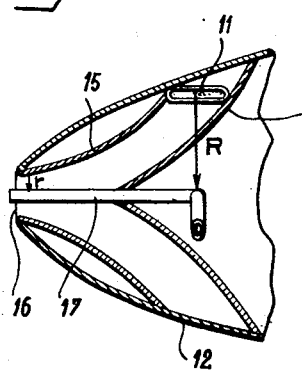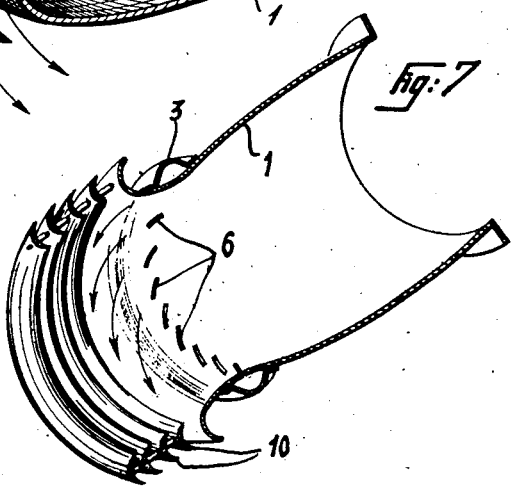

United States Patent Office
Patented Sept. 24, 1957

2,807,137

JET DEFLECTING DEVICE FOR JET PROPULSION UNITS

Henri L. P. Meulien, Courbevoie, Jean H. Bertin, Neuilly-sur-Seine, and Marcel Kadosch, Paris, France, assignors to Societe Nationale d'Etude et de Construction de Moteurs d'Aviation, Paris, France, a French company Application July 12, 1954, Serial No. 442,796

Claims priority, application France July 15, 1953

11 Claims. (Cl. 60—35.54)

In the case of certain applications, it is useful to be able to deflect a flow of fluid from its normal direction of flow through an orifice. In particular, this is the case in propulsion units and reaction discharge nozzles in which it is sought to modify the value and/or the direction of the thrust by deflection of the jet, in such a way as to obtain, for example, a braking effect, which becomes more and more powerful as the jet is more and more deflected towards the front of the propelled object.

The means for deflection which forms the object of the present invention, makes use of a rotation given to the fluid flow, in the conduit which conducts this flow, in front of the outlet orifice of the said conduit, in such manner that under the effect of the centrifugal force thus created on the molecules of the fluid, the latter tends to enter deflecting channels which have their openings around the normal part of the flow and which have a suitable direction, these channels being formed, for example, between curved blades placed on the downstream side of the outlet orifice.

In accordance with the device which forms the object of the invention, the rotational movement of the fluid is caused by applying to it at a given moment a flow of auxiliary fluid having a suitable direction.

Many forms of embodiment of this device are possible. The auxiliary fluid may, for example, be injected into the conduit through nozzles suitably directed so that the speed of the auxiliary fluid has a more or less substantial tangential component, thus transmitting to the fluid passing through the conduit tangential impulses which cause it to rotate.

The auxiliary fluid may also be injected by means of slots or of series of orifices so directed with respect to the axis of the conduit that the jets of auxiliary fluid set up a kind of fluid directing-blades.

The above two forms of embodiment may furthermore be used in combination with each other.

In accordance with a further form of embodiment, the auxiliary fluid has already a high speed of rotation and is led to escape in the central part of the flow of the fluid to be deflected, thus forming a vortex jet which spreads out to push back the fluid to be deflected towards the deflecting channels, whilst at the same time giving to this fluid a rotational movement which facilitates the deflection by a centrifugal effect.

The invention extends to the arrangements comprising means for injecting an auxiliary fluid into the conduit of the fluid to be deflected and arranged in such manner as to give to this fluid a rotational component around the axis of the said conduit.

The description which follows below with respect to the attached drawings (which are given by way of example only and not in any sense by way of limitation) will make it quite clear how the invention may be carried into effect, the special features which may be brought out, either from the drawings or from the text being understood to form a part of the said invention.

Fig. 1 is a half axial cross-section of an exhaust discharge conduit of a reaction propulsion unit provided with a form of embodiment of an arrangement in accordance with the invention.

Figs. 2 to 5 are transverse partial cross-sections to a larger scale, following the lines II, III, IV and V of Fig. 1.

Fig. 6 is a developed view on a larger scale of a portion of the internal wall of the exhaust conduit.

Fig. 7 gives a perspective view of an alternative form of construction.

Fig. 8 shows in perspective and in cross-section, a discharge conduit provided with an alternative form of construction of the arrangement.

Fig. 9 is an axial cross-section of a portion of Fig. 8.

In the form of embodiment shown in Figs. 1 to 6, the internal wall of the conduit 1 which is connected at 2 to the delivery of the gas turbine or to the combustion chamber in the case of a ramjet unit or athodyd, is provided with a number of series of small slots or holes distributed over the periphery of the exhaust conduit. In the example shown in the drawings, there are thus provided four series of slots situated in the respective transverse planes corresponding to II, III, IV and V. These slots communicate at the exterior of the exhaust nozzle with a collector 3 which is connected by means of a pipe 4 and a valve 5 to a source of gas under pressure, for example to the delivery side of the air compressor of the reaction unit in the case of a turbo-jet unit, or to an auxiliary compressor. The slots 6 of the first series situated in the plane II are pierced radially in the wall of the exhaust conduit (see Fig. 2). The slots 7 of the second series located in the plane III are pierced in such a manner that their axis makes a certain angle, for example 30°, with the corresponding radii (see Fig. 3). The slots 8 and 9 of the two following series IV and V are pierced in such a way that their axes make angles which are a little greater with the radii, for example 45° and 60° (see Figs. 4 and 5).

In addition, on the internal surface of the exhaust conduit, the orifices of the slots have different inclinations with respect to the axis of the exhaust conduit. Thus the orifices of the slots of plane II may be parallel to the axis of the discharge conduit, those of the slots of plane III may be inclined, for example at 30° to the axis of the exhaust conduit, and those of the slots of planes IV and V may be inclined respectively at 45° and 60°, the orifices of the slots on the interior of the exhaust conduit being thus located on a kind of variable-pitch screw (see Fig. 6).

When the valve 5 is opened, the fluid under pressure led through the pipe 4 into the collector 3 escapes into the exhaust conduit through the slots 6, 7, 8, 9 and thereby forms small jets which penetrate into the gases flowing through the exhaust conduit, the penetration being more and more considerable as the pressure of auxiliary fluid in the collector 3 is greater with respect to the static pressure of the gases flowing through the exhaust conduit. In the drawings, the slots are shown as pierced at the neck of the exhaust conduit or in the vicinity of this neck, that is to say at a point at which the static pressure of the gases flowing in the conduit is low.

Fig. 6 shows to a larger scale four slots 6, 7, 8, 9 which follow each other in the direction of flow of the gases. The effect of slots of this kind is two-fold. On the one hand, the progressive inclination to the radius of the axes of the slots has the effect of imparting to the auxiliary jets issuing from these slots a tangential component of speed which increases from the plane II to the plane V, so that these jets apply to the fluid flowing inside the exhaust conduit tangential increasing impulses which cause it to begin to rotate about the axis of the discharge conduit. On the other hand, the inclination, also progressive, of the orifices of the slots with respect to the exhaust conduit, causes the wakes (see Fig. 6) created by the auxiliary jets as they penetrate into the exhaust conduit, to be more and more inclined with respect to the axis of the latter, thereby forming a kind of fluid guiding blade constituted by the envelope of the elementary wake-zones and again tending to set in rotation the gases flowing inside the exhaust conduit. The rotational movement thus given to the gases flowing through the exhaust conduit creates a centrifugal pressure on the wall of the latter, and if the orifice of the exhaust conduit is followed by a series of channels arranged, for example, between the blades 10 located outside the normal path of the jet, the gases will escape through these channels. By providing a suitable incurved form for these channels, that is to say the blades 10, towards the front of the body propelled, there may thus be obtained a reversal of direction of flow of the jet with a consequent braking effect. This action begins as soon as the valve 5 is opened and ceases when it is closed. The slots or holes will be small enough for the available flow of auxiliary gas to be suitably distributed.

In a further alternative form shown in Fig. 7, the slots 6 have a relatively large linear development and their axis is radial, but they are inclined with respect to the axis of the exhaust conduit so that the jets which issue from them behave as if they were fluid guide-blades.

It will be quite clear that each of the slots 6 could be replaced by a series of radial holes.

In the alternative form shown in Figs. 8 and 9, there is utilized the effect of an axial vortex produced by the auxiliary fluid. The latter is injected tangentially through a conduit 11 into the interior of the fixed nose 12 which follows the turbine wheel 13. The space provided in this nose for the fluid which is thus injected into it tangentially, is a space of revolution comprised between two surfaces 14 and 15 and opening towards the rear of the nose by an axial hole 16 of radius $r$ much smaller than the radius R on which the orifice of the tangential conduit 11 is situated, the radius of the surface 15 continuing to diminish progressively from R to $r$. By virtue of the principle of conservation of kinetic torque, the fluid entering at 11 in a tangential direction assumes a gyratory movement which becomes more and more rapid as it approaches the outlet orifice 16, that is to say as the radius of the space in which this movement is effected tends to diminish. It is thus discharged through the orifice 16 with a high speed of rotation. Under the effect of centrifugal force, the fluid thus forms a vortex which spreads out very rapidly and reaches the deflecting blades 10. This vortex acts in two different ways on the jet of gas issuing from the exhaust conduit 11. On the one hand it forms a kind of screen which compels the jet to pass between the blades 10 and, on the other hand, it transmits to the jet its own movement of rotation which produces in the jet itself a centrifugal force, spreading it out towards the blades. The jet is thus deviated through these blades. The effect obtained may be increased by supplying pressure fluid to the wake-zone, that is to say the zone of depression which tends to be formed in the axis of the vortex issuing from the orifice 16. For this purpose there may be provided a small axial tube 17 passing out through the centre of the orifice 16 and connected to a source of gas under pressure. This source may be the external atmosphere at any point of the casing of the reaction unit at which this atmosphere is under pressure. The axial tube 17 may, for example, be connected by a suitable pipe 17a to a point situated on the upstream side of the casing.

The auxiliary fluid used to effect the deflection may be directly derived from the compressor of the reaction unit or it may be supplied by an auxiliary compressor.

As the auxiliary fluid, there may also be utilised the gas discharged from a combustion chamber located after the auxiliary compressor, or after the point of derivation from the compressor of the reaction unit, so as to use a hot gas as the auxiliary fluid.

What we claim is:

1. In a jet propulsion unit having a propulsive nozzle designed for forming an axial jet, a jet deflecting device operatively associated with said nozzle and comprising peripheral jet guiding means extending laterally of and outside the normal flow path of said axial jet, and controllable means for imparting to said axial jet a rotational velocity component about the axis of said nozzle, whereby the jet is centrifugally urged towards and laterally deflected by said jet guiding means, said controllable means comprising fluid injecting means opening into said axial jet, upstream of said jet guiding means, for forming a generally helical auxiliary jet in fluid contact engagement with said axial jet.

2. Device as claimed in claim 1, wherein the jet guiding means comprises a set of generally annular vanes spaced from each other along and outside the flow path of the axial jet.

3. Device as claimed in claim 1, wherein the jet guiding means comprises an outwardly curved, convex extension of the nozzle.

4. Device as claimed in claim 1, wherein the fluid injecting means is supplied with compressed air.

5. Device as claimed in claim 1, wherein the fluid injecting means comprises an auxiliary nozzle located axially of the propulsive nozzle and facing towards the rear of the unit, and supply means for feeding said auxiliary nozzle with a flow having a substantial rotational velocity component about the axis of the nozzle.

6. Device as claimed in claim 5, wherein the pressure fluid supply means comprises a chamber of circular cross-section communicating with the auxiliary nozzle and piping means opening into said chamber through an orifice orientated substantially at right angles with the radial plane containing said orifice.

7. Device as claimed in claim 6, wherein the cross-section of the chamber decreases towards the auxiliary nozzle, whereby the velocity of the flow increases as it approaches said auxiliary nozzle.

8. Device as claimed in claim 5, further comprising means for blowing fluid centrally of the auxiliary nozzle, towards the rear of the unit, and generally parallel to the axis of the propulsive nozzle.

9. Device as claimed in claim 1, wherein the fluid injecting means comprises a plurality of slot-like passages opening at the periphery of the propulsive nozzle and designed for forming fluid sheets in the general shape of guide blades of increasing incidence.

10. Device as claimed in claim 9, wherein each sheet is formed by a continuous slot.

11. Device as claimed in claim 9, wherein each sheet is formed by a plurality of successive orifices making, with axial planes through the propulsive nozzle, angles which increase towards the rear of the unit.

References Cited in the file of this patent

UNITED STATES PATENTS

| 2,308,059 | Decker | Jan. 12, 1943 |
| 2,358,690 | Decker | Sept. 19, 1944 |

FOREIGN PATENTS

| 691,302 | Great Britain | May 13, 1953 |
| 1,020,287 | France | Nov. 12, 1952 |